(12) United States Patent
Evanitsky

(10) Patent No.: US 8,135,656 B2
(45) Date of Patent: Mar. 13, 2012

(54) ONLINE MANAGEMENT SERVICE FOR IDENTIFICATION DOCUMENTS WHICH PROMPTS A USER FOR A CATEGORY OF AN OFFICIAL DOCUMENT

(75) Inventor: Eugene S. Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 946 days.

(21) Appl. No.: 12/107,378

(22) Filed: Apr. 22, 2008

(65) Prior Publication Data

US 2009/0265762 A1    Oct. 22, 2009

(51) Int. Cl.
   *G06G 1/12*    (2006.01)
(52) U.S. Cl. ........................................................ 706/21
(58) Field of Classification Search ............... 706/12, 706/45–48, 62
   See application file for complete search history.

(56) References Cited

U.S. PATENT DOCUMENTS

| | | | | |
|---|---|---|---|---|
| 7,693,827 | B2 * | 4/2010 | Zamir et al. | 707/999.003 |
| 2005/0258246 | A1 * | 11/2005 | Wolff et al. | 235/454 |
| 2007/0011140 | A1 * | 1/2007 | King et al. | 707/3 |
| 2007/0172155 | A1 * | 7/2007 | Guckenberger | 382/305 |
| 2007/0258645 | A1 * | 11/2007 | Gokturk et al. | 382/190 |
| 2008/0244429 | A1 * | 10/2008 | Stading | 715/764 |
| 2008/0302870 | A1 * | 12/2008 | Berini et al. | 235/380 |
| 2009/0089366 | A1 * | 4/2009 | Toth | 709/203 |
| 2009/0187417 | A1 * | 7/2009 | Lidestri | 705/1 |
| 2009/0265762 | A1 * | 10/2009 | Evanitsky | 726/3 |
| 2010/0153440 | A1 * | 6/2010 | Hubert | 707/769 |

* cited by examiner

*Primary Examiner* — David Vincent
(74) *Attorney, Agent, or Firm* — MH2 Technology Law Group LLP

(57) ABSTRACT

An online identification document management service includes a host server having a web-based interface adapted to facilitate secure customer access to the host server. The host server is configured to receive identification data communicated from the customer through use of a computing device. The identification data includes at least one of an imaged identification document and information related to the imaged identification document. A processing module is in operative communication with the host server and is configured to process the identification data communicated from the customer. A processing software application is trained to classify the processed identification data and selectively extract data therefrom based on the classification. The processing software application is configured to selectively present the processed identification data for a customer verification via the web-based interface upon at least one of an unsuccessful classification and an unsuccessful extraction of data. A storage device is in operative communication with the processing module and is configured to store the extracted data as metadata upon at least one of the customer verification and the extraction of data. The processing software application is cumulatively trained to subsequently classify the processed identification data successfully upon the customer verification thereof. A content management software application operates on the host server and is configured to process a customer request through the web-based interface to selectively generate at least one reproduction of the processed identification data.

14 Claims, 3 Drawing Sheets

ONLINE MANAGEMENT SERVICE FOR IDENTIFICATION DOCUMENTS WHICH PROMPTS A USER FOR A CATEGORY OF AN OFFICIAL DOCUMENT

BACKGROUND

1. Technical Field

The present disclosure relates to an online data processing service, and, in particular, to a system and method for providing an online management service for personal documents, such as identification documents.

2. Description of Related Art

Every person or family has important identification documents that need to be referenced occasionally or reproduced because of theft or loss. Passports, driver's licenses, or other identification are often lost or stolen and situations occasionally arise that require proof of identification when applying for services such as, for example, Medicaid and Social Security benefits. Proof of identification is also needed for applying for special documentation such as marriage licenses, death certificates, and passports.

Managing personal documents can be a difficult task for anyone. Identification documents, in particular, are handled often and, as a result, are easily lost, destroyed, and even stolen. Further, identification documents, such as birth certificates, death certificates, baptism certificates, marriage licenses, divorce papers, armed services enlistment or discharge documentation, passports, drivers license, and medical insurance cards, occasionally need to be reproduced. Often these documents are difficult to find when needed. Also, family members may need to access these documents in the event one becomes incapacitated or dies. Additionally, many are unaware of the wide variety of situations where certified identification is warranted and, thus, fail to properly organize and store identification documents.

SUMMARY

In an embodiment of the present disclosure, an online identification document management service includes a host server having a web-based interface adapted to facilitate secure customer access to the host server. The host server is configured to receive identification data communicated from the customer through use of a computing device. The identification data includes at least one of an imaged identification document and information related to the imaged identification document. A processing module is in operative communication with the host server and is configured to process the identification data communicated from the customer. A processing software application is trained to classify the processed identification data and selectively extract data therefrom based on the classification. The processing software application is configured to selectively present the processed identification data for a customer verification via the web-based interface upon at least one of an unsuccessful classification and an unsuccessful extraction of data. A storage device is in operative communication with the processing module and is configured to store the extracted data as metadata upon at least one of the customer verification and the extraction of data. The processing software application is cumulatively trained to subsequently classify the processed identification data successfully upon the customer verification thereof. A content management software application operates on the host server and is configured to process a customer request through the web-based interface to selectively generate at least one reproduction of the processed identification data.

According to another embodiment of the present disclosure, an online identification document management service includes a host server having a web-based interface adapted to facilitate secure customer access to the host server. The host server is configured to receive at least one imaged identification document communicated from the customer via a computing device. A processing module is in operative communication with the host server and is configured to process the at least one imaged identification document communicated from the computing device and selectively extract data from the at least one processed imaged identification document. A storage device is in operative communication with the processing module and is configured to store the extracted data as metadata and the at least one processed imaged identification document as a digital image for graphical representation via the web-based interface. A software-as-a-service application operates on the host server and is configured to process a customer request through the web-based interface to selectively generate at least one reproduction of the at least one imaged identification document.

The present disclosure also provides for a method for providing an online identification document management service. The method includes the initial steps of training the service to successfully classify at least one identification document and facilitating secure customer access to the service through a web-based interface to receive identification data communicated from the customer through use of a computing device. The identification data includes at least one of an imaged identification document and information related to the imaged identification document. The method also includes the steps of processing the identification data communicated from the customer and classifying the processed identification data and selectively extracting data therefrom based on the classification. The method also includes the steps of selectively presenting the processed identification data for a customer verification via the web-based interface upon at least one of an unsuccessful classification and an unsuccessful extraction of data and storing the processed identification data in a user profile corresponding to the customer upon at least one of the customer verification and the extraction of data. The method also includes the steps of cumulatively training the service to subsequently classify the processed identification document successfully based on the customer verification and processing a customer request through the web-based interface. The method also includes the step of selectively generating at least one of instructional information related to the processed identification data and a reproduction of the imaged identification document based on the customer request.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
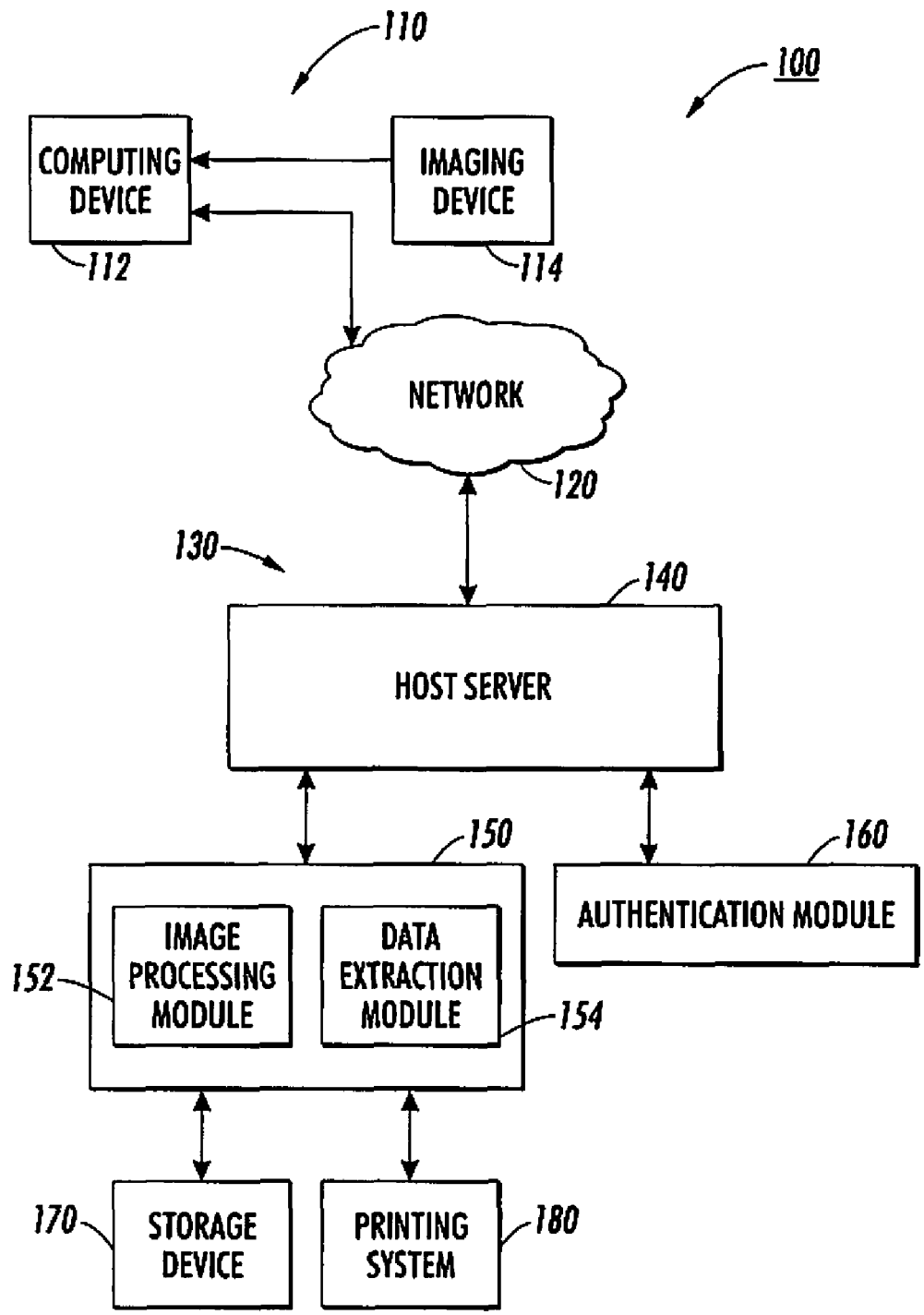
FIG. 1 is a block diagram of an online management service for identification documents in accordance with the present disclosure.

Embodiments of the presently disclosed online identification document management service will now be described in detail with reference to the drawings in which like reference numerals designate identical or corresponding elements in each of the several views.

The present disclosure relates to an online data processing service, and, in particular, to a system and method for an online management service for personal documents related to identification documents. In an embodiment of the present disclosure, personal documents are stored and managed on a host system having a host server accessible by customers through use of a computing device (e.g., computer, cell phone, PDA, etc.). Customers accessing the host server are greeted by a website interface adapted to provide personal services. For example, personal services may be provided by Xerox® Corporation through a Xerox® Personal Services (XPS) website. More specifically, the personal services website or XPS website employs a user interface (UI) adapted to enable the customer to utilize a service such as Software-as-a-Service ("SaaS") to manage, access, and reproduce their identification documents for themselves, family members, or any third-party. Examples of identification documents include, but are not limited to, birth certificates, death certificates, baptism, marriage, divorce, armed services enlistment or discharge documentation, passports, drivers license, and medical insurance cards. SaaS is a software application delivery model where a software vendor develops a web-native software application and hosts and operates (either independently or through a third-party) the application for use by its customers over a network (e.g., the Internet). Customers do not pay for owning the software itself but rather for using the service. That is, the customers may pay a periodic subscription fee (e.g., monthly, annually, etc.) for the right to use the software over the Internet (e.g., through the UI). In other embodiments, the customer may pay a one-time fee for a lifetime subscription and/or an additional fee to provide added access or additional accounts to family members. Added access to the service for family members may be offered at a discount relative to the original customer account. In other embodiments, a usage fee may be charged for each document processed along with additional fees for storage and access. Upon expiration of the subscription and/or in the event the customer no longer wishes to subscribe to or use the service, the XPS may provide the customer with a DVD and/or a CD ROM having a complete archive of the customer's data stored thereon. Further, the XPS may provide the customer with a suitable software application that is adapted to extract the archived data from the DVD or CD ROM to the customer's computing device for viewing.

In embodiments, the customer may be the subscriber or a third party (e.g., family member) granted authorization from the subscriber to access the service through the XPS website, as will be discussed below. In addition to a identification document management service, the XPS website may provide a variety of data management services (e.g., certified document replacement service) to which customers may subscribe and access through a common UI or through one or more related websites.

The customer may utilize an imaging device (e.g., scanner, camera, cell phone, etc.) to capture images of documents and subsequently communicate the image data to a computing device. The computing device is adapted to upload (e.g., utilizing FTP, drag-and-drop, etc.) the scanned images as image files (e.g., digital image files) to the host server through use of the UI. Once uploaded, documents are processed by the host system and presented to the customer to enable a quality assurance check, as will be discussed in further detail below. It should be appreciated that the customer may also upload captured image data from a hand-held computing device (e.g., cell phone, PDA, etc.) to the host server directly. For example, the customer may utilize a web-enabled cell phone camera to capture an image of an identification document and access the host server directly to upload the captured image data. The customer may further input identification information that may not be adapted for imaging and/or scanning through use of the UI. For example, customers may choose to input supplemental information to complement uploaded image files such as, for example, key dates, category of identification document (e.g., passport, birth certificate, etc.), privacy or access settings (e.g., particular documents may be accessible only by certain family members), size preference of images, etc.

In embodiments, a variety of authentication mechanisms (e.g., username, password, etc.) may be employed to prevent unauthorized access to the service. In this scenario, authenticating information such as, for example, a username and password is required to access the service and/or the personal data of the customer. Further, the customer may grant authorization privileges to third parties (e.g., family, guardian, etc.), which allows them access to the account of the customer. Once secure access to the service is gained and the customer has uploaded the desired files to the host system, the files are processed by the host system and key data is extracted from the processed files and stored in a storage device (e.g., a database) as metadata in a user profile or folder designated for a given customer. In embodiments, the host system may, in addition to metadata, store images of the uploaded files as digital image files (e.g., JPG, GIF, PNG, TIF, etc.) or as PDF files in the storage device to provide archive protection. In this manner, the XPS may offer a guarantee that uploaded documents will not be altered once received and processed by the host system. That is, once documents are uploaded, processed, and stored by the host system, customers need not be concerned with misplacing or losing so-called "hard copy" documents.

The host system may employ a suitable processing software application having optical character recognition ("OCR") functionality to process uploaded files and extract key data therefrom for storage in the user profile of the customer. The processing software application is "trained" with sample sets of identification documents to enable identification of the type or classification of document processed, as will be discussed in further detail below. In embodiments, file paths to specific metadata stored in the storage device may be graphically represented as associated links (e.g., hyperlinks) on the XPS website. The customer selects an associated link to view information (e.g., document images) stored in the user profile. The user profile may be configured such that the customer may view information according to any one or more categories such as, for example, family members, date of entry, category of identification, etc. In this way, all associated links may be discovered by the customer through the UI and all information in the user profile may be reviewed for accuracy. The customer can then make any necessary changes to the user profile accordingly.

In embodiments, the service is adapted to reproduce an identification document in so-called "hard copy" format (e.g., via a Xerographic printing device) and/or graphically over a network (e.g., via the UI of the XPS website, incorporated in an email, etc.) at the request of the customer or an authorized third-party. However, certified copies of certain identification documents require authorized release from the appropriate governing body. For example, certified copies of birth certificates can only be officially reproduced by the Department of Vital Statistics in the area where the customer was born. Also, drivers licenses can only be reproduced by the Department of Motor Vehicles. In these and other similar scenarios, the XPS may provide a certified document replacement service to provide information and/or links to information through the XPS website to inform customers how to obtain certified copies of identification documents. Based on the extracted metadata for a given identification document, the service determines the contact information (e.g., location, phone number, website, etc.) and/or procedure for obtaining certified copies of that document and provides this information to the customer via the XPS website. For example, the SaaS may employ any suitable web application (e.g., web 2.0®, mashup applications, etc.) to enable sharing of updated information from other websites with the customer for that purpose. The certified document replacement service may be offered by the XPS as part of the identification document management service or, alternatively, as a related service requiring an additional subscription and/or a related fee.

For each identification document managed by the service, the corresponding metadata may include vital information such as, for example, the name and date of birth of individual identified on the document, category of identification (e.g., passport, drivers license, college ID, insurance card, AAA card, AARP card, social security card, etc.), sizing of document (e.g., wallet size, A4, letter, legal, etc.), date of entry, expiration dates, etc. Other vital information may be included and the above list should not be construed as exhaustive. The XPS website may include other associated links representing file paths to supplemental information available to the customer (e.g., customer-preferences, user profile, transaction history, etc.) and stored in the user profile of that customer. In embodiments, the UI may include search functionality to permit the customer to methodically search metadata and/or content stored in the user profile. That is, the customer may search and/or sort their identification documents based on any one or more vital information parameters included in the metadata, as listed above.

Customer-selected preferences may be utilized to customize the XPS website experience for each customer individually. For example, customers may utilize the UI to select recipients of document reproductions and, further, methods of communicating document reproductions (e.g., email, snail mail, etc.) reproduced by the host system (e.g., unofficial documents). Further, customers may selectively and/or automatically receive reports (e.g., updates, status reports, etc.) related to any one or more identification documents and/or user profiles (e.g., other family members) managed by the service.

Reference is first made to FIG. 1, which shows system architecture of a data processing system 100 adapted to process, store, and manage documents in accordance with embodiments of the present disclosure.

Generally, data processing system 100 includes at least one computing device 110 and a host system 130. The host system 130 includes a host server 150 accessible by the computing device 110 via a network 120 (e.g., Internet, WAN, LAN, Bluetooth, etc.). The computing device 110 may be any known computing device (e.g., computer, hand-held computing device, cell phone, personal digital assistant (PDA), etc.) suitable to communicate data over a network (e.g., Internet, WAN, LAN, Bluetooth, etc.). In embodiments, the computing device 110 may include several components, including a processor, RAM, a hard disk drive, a USB interface, a network interface, a computer display/monitor, a computer mouse, a computer keyboard, and/or other components. Computing device 110 may also include software adapted to provide document management functionality and/or digital image management functionality.

In the illustrated embodiment, the computing device 110 is adapted to operably communicate with an imaging device 112 (e.g., a xerographic copy device, a camera, a scanner, a cellular phone, etc.). It will be appreciated that the imaging device 112 may utilize image capture technology to scan documents which are subsequently converted to digital image files (e.g., JPG, GIF, PNG, TIF, etc.) utilizing a suitable software driver. The digital image files are subsequently communicated to the computing device 110. The customer accesses the host server 140 via the network 120 to upload the scanned image file thereto, as will be discussed in further detail below. In embodiments, the imaging device 112 and computing device 110 may be integrally formed. For example, a cell phone including an onboard camera may be utilized to scan, process, and communicate identification documents directly to the host server 150.

The host server 140 may be any suitable network device running any known operating system and configured to communicate data over the network 120. In other words, a computer, switch, router, gateway, network bridge, proxy device or other network device that is programmed or otherwise configured to operate as explained herein is considered an embodiment of this disclosure. It should be appreciated that any data communicated to or from the host server 140 may be encrypted by the service to ensure that customer information is kept private.

The host system 130 further includes a processing module 150 in operable communication with the host server 140. The processing module 150 includes an image processing module 152 adapted to process uploaded image files and an extraction module 154 adapted to extract data from the image files processed by the image processing module 152. In embodiments, the image processing module 152 employs an optical character recognition ("OCR") software application to process the uploaded image files. Several optical character recognition software applications are presently commercially available (e.g., Brainware, XRCE Categorizer, etc.). It should be appreciated that embodiments of the present disclosure are adapted to operate utilizing any OCR software application within the purview of one skilled in the art. Upon processing by the OCR, the processed image files are classified (e.g., by document type) by the extraction module 154 using the processing software application. The processing software application may be the OCR itself, or, alternatively, a separate software application. Based on the classification, the processing software application extracts key data from the classified document. Typically, software applications utilized to seek out data from unstructured or semi-structured documents require "training" with sample sets of unstructured data. This training enables the processing software application to recognize key data on a given document to classify the document (e.g., category of identification document) and, based on this classification, seek out and extract pertinent data therefrom. Typically, identification documents are semi-structured and include key words and information that the processing software application may be trained to detect and extract. The processing software application is "trained" with sample sets of identification documents and documents related thereto to enable the classification of documents and extraction of key data therefrom.

In embodiments, the service enables the customer to perform a quality assurance check of all documents processed by the system 100 prior to storage therein. For example, if the processing software application is unable to extract data from a document and/or classify the document with certainty, the customer is alerted through the UI. In response to this alert, the customer may utilize the UI to verify the classification of the document and/or the data from the document and, further, make corresponding modifications. Further, the system 100 is self-learning in that each successful classification and extraction related to a processed document enables the system 100 to accumulate a so-called "knowledge-base" of identification documents to complement the trained processing software application. In this way, the system 100 learns with each document processed, whether successfully or unsuccessfully and subsequently verified and/or modified. That is, once a document or document type has been verified and stored by the system 100, subsequent documents of the same or substantially similar type may not require verification by the customer thereafter.

The data extracted by the data extraction module 154 is stored in a storage device 170 in operative communication with the processing module 150. In embodiments, the storage device 150 may be a database or a plurality of databases in operative communication with the processing module 150. In other embodiments, the host server 140 may include one or more onboard databases.

In the illustrated embodiment, the host system 130 includes a printing system 180 in operative communication with the processing module 150. The printing system 140 may be, for example, one or more xerographic printing devices configured to retrieve print instructions from the service corresponding to a document reproduction request, and, subsequently, print the reproduction onto a substrate (e.g., printing paper, photo paper, etc.). In this scenario, the customer may access the XPS website through the UI (e.g., via remote computing device, cell phone, PDA, etc.) to select a link and request the reproduction of specific documents (if available). The SaaS may incorporate a content management software application adapted to process the customer request and generate corresponding print instructions to the printing system 140. Once printed, the reproduction may be mailed to the customer or authorized third party (e.g., by an XPS representative) and/or made available for pickup by the customer (e.g., at an XPS office location). Alternatively, the printing system 180 may be any suitable web-enabled printing device adapted to receive print instructions over a network (e.g., the Internet) from the host server 150 or locally from the customer's remote computing device (e.g., cell phone, laptop, PDA, etc.). In this scenario, the customer accesses the service through the UI of the XPS website with a web-enabled computing device and requests a document reproduction be printed from a printer at a location near the customer or convenient for the situation. For example, the customer may be in a situation where identification is needed and that customer misplaced or forgot identification. Advantageously, the customer may use the service to print a document reproduction from the printer of the party requesting the identification. Alternatively, the customer may access the XPS website and generate a graphical reproduction of an identification document on the display of a web-enabled cell phone or PDA to show the requesting party.

For scenarios where a certified copy of a document is needed, replacement instructions may be generated, via the certified document replacement service, in lieu of a printed reproduction of a document to provide the customer with information (e.g., governing body to contact, contact information, procedures, etc.) instructing the customer how to obtain a certified copy of a particular document.

In embodiments, document reproductions and/or replacement instructions may be sent from the host server 140 to the computing device 110 via a customer-selected email address over the network 120. That is, the customer may utilize the UI to specify one or more email addresses at which to receive email reproductions and/or replacement instructions and to select a link to effect such email reproduction and/or replacement instructions being sent. Any document reproductions and/or replacement instructions sent from the host server 140 to the computing device 110 may be encrypted by the service to ensure that customer information is kept private. In embodiments, replacement instructions may be provided graphically on the UI of the XPS website at the request of the customer. In this manner, the customer may quickly and conveniently access the XPS website (e.g., via cell phone, laptop, etc.) to retrieve replacement instructions for any one or more identification documents stored in the user profile or otherwise (e.g., the website may offer replacement instructions for common forms of identification). It should be appreciated that generating document reproductions and replacement instructions in email format does not preclude the service from generating additional reproductions and/or instructions in hard-copy format via the printing system 180 or replacement instructions via the UI of the XPS website.

Use of the data processing system 100 according to embodiments of the present disclosure will now be discussed. Starting from the computing device 110, access to a secure web portal located on the host server 140 may be gained via the network 120 using security protocols such as, for example, secure sockets layer (SSL) or secure HTTP (S-HTTP). Secure access may be managed by the authentication module 160 employing a suitable authentication mechanism. That is, once a secure link is established, the authentication module 160 may prompt the customer to input a user name and password, account number, key words, a challenge-response test (e.g., CAPTCHA™), or other identifying information to facilitate access to the service. Once secure access to the service is gained, the customer may interact with the UI to select an associated link to a particular management service such as, for example, the identification document management service. Additional associated links may be provided for other document management services which may be offered by the XPS (e.g., certified document replacement service, etc.). Once a specific management service is selected, the customer uploads image files and/or data to the host server 140 related to that particular service.

In embodiments, the customer may choose to receive a status report and/or history report pertaining to any one or more report parameters such as, for example, a particular family member, a category of identification, date of entry, etc. In this scenario, the content management software application provides, via the UI, report-generating links configured to generate a status report (e.g., complete history) corresponding to any one or more of the report parameters. Additional links may be included that are configured to permit the customer to choose the format(s) in which the report will be generated. In this manner, the customer may further choose the format(s) in which document reproductions and replacement instructions will be generated. For example, the customer may select the report-generating link to have the report for a particular report parameter emailed to an email address of their choosing. Additionally or alternatively, the customer may choose to receive a report in a hard-copy format wherein the host system 130 prints the report via the printing system 180. In embodiments, the customer may additionally choose to have reports, document reproductions, and replacement instructions sent to third parties (e.g., family members).

In the illustrated embodiment, the data processing system 100 includes a single computing device 110 adapted to communicate with the host system 130. This configuration is illustrative only in that access to the host server 120 may be gained by any paying customer (e.g., as dictated by the authentication module 160) utilizing a suitable web-enabled computing device.

Figure 2:
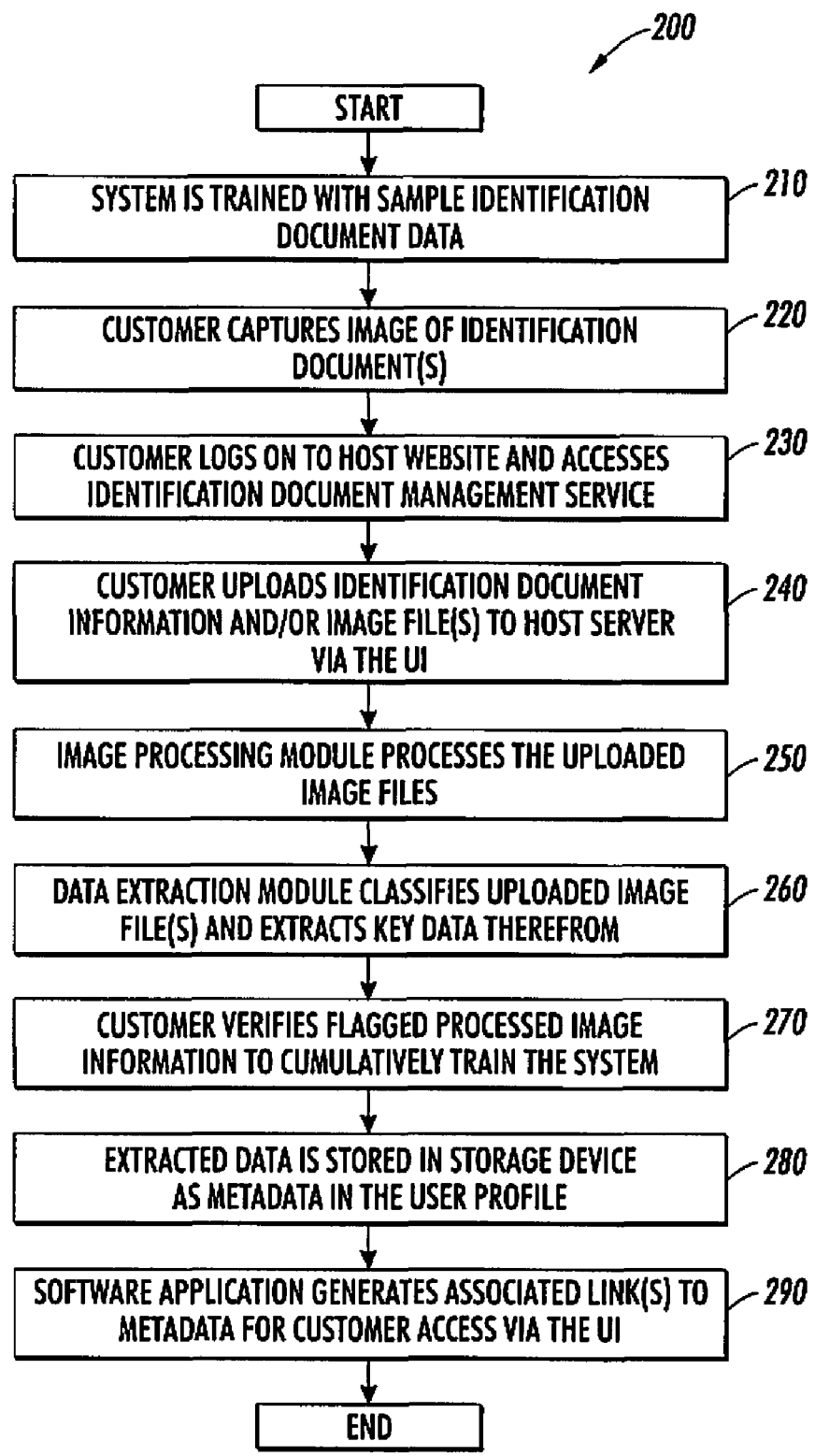
FIG. 2 is a flow chart diagram illustrating a method for providing an online management service for identification documents in accordance with one embodiment of the present disclosure.

FIG. 2 illustrates a method 200 for utilizing embodiments of the system disclosed herein. In step 210, the processing software application is trained with sample sets of unstructured and/or semi-structured identification documents. In step 220, the customer utilizes the imaging device 114 or the computing device 112 to capture an image of the desired identification documents. The computing device 112 interfaces with the imaging device 114 to receive the imaged documents therefrom or, alternatively, the computing device 112 is adapted to image the documents itself (e.g., a cell phone). The computing device 112 may be adapted to manage the imaged documents as digital image files (e.g., via any suitable digital imaging software application). In step 230, the customer gains secure access to the host server 140 by logging on to the XPS website utilizing one or more authentication mechanisms (e.g., user name and password) managed by the authentication module 160. Once secure access to the host server 140 is gained, the customer utilizes the UI to access the desired management service (e.g., identification document management service) and upload the desired image file(s) from the computing device 112 to the host server 140 in step 240. In step 250, the processing module 150 executes the trained processing software application which, in turn, classifies the image file(s) and extracts key data therefrom in step 260. Upon an unsuccessful classification and/or extraction of an uploaded image file, the processing software application flags the image file and/or alerts the customer via the UI to allow the customer to verify the related information and make any necessary changes in step 270. In this manner, the training of the system 100 is ongoing with each subsequent image file uploaded. In step 280, the key data extracted in step 260 and/or the data verified in step 270 is stored in the storage device 170 as metadata in the user profile of the customer. In step 290, the content management software generates associated links on the XPS website that the customer may select to access the user profile and view identification documents and related information.

Figure 3:
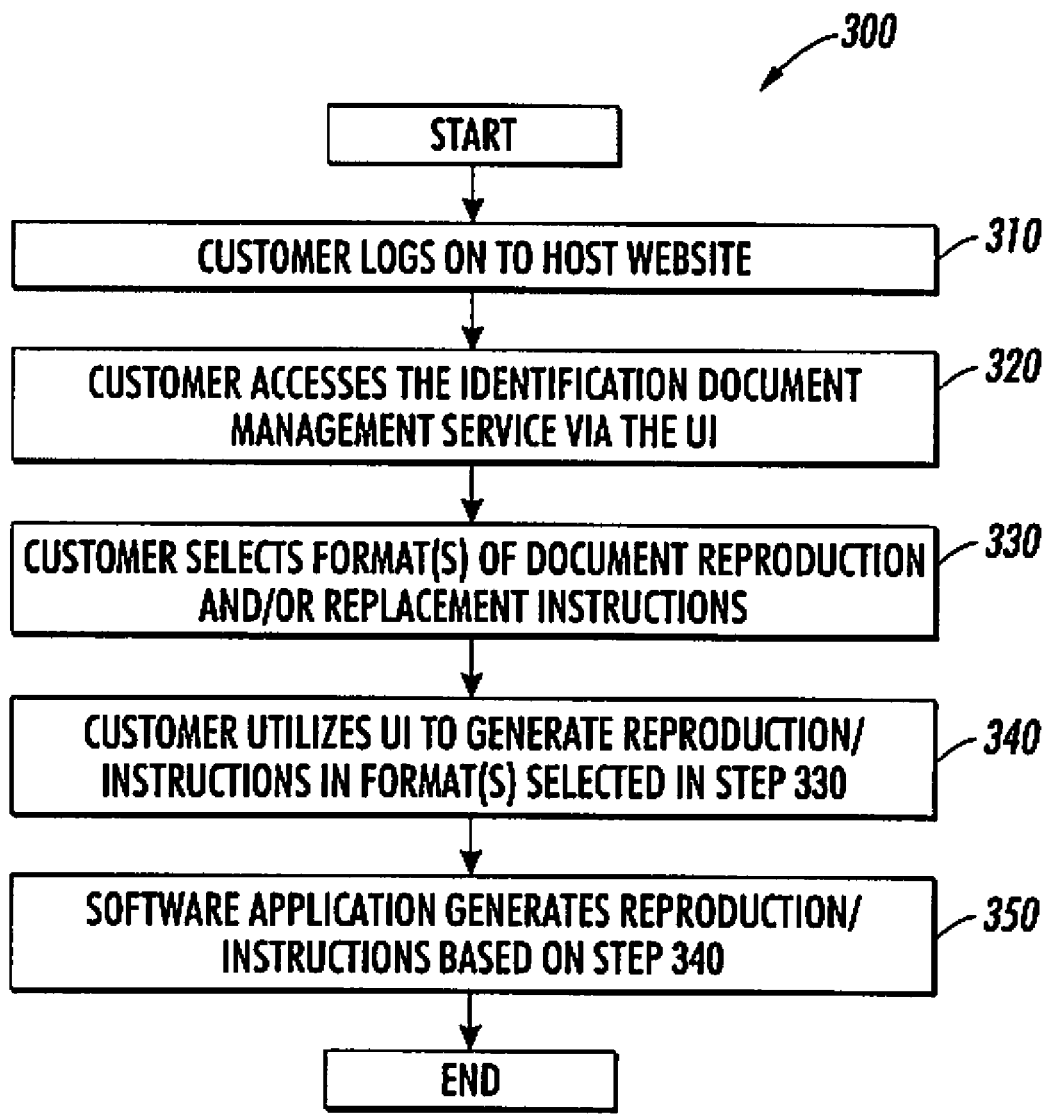
FIG. 3 is a flow chart diagram illustrating a method for providing an online management service for identification documents in accordance with another embodiment of the present disclosure.

FIG. 3 illustrates a method 300 for selectively generating a identification document reproduction and/or replacement instructions according to embodiments of the present disclosure. In step 310, the customer gains secure access to the host server 140 by logging on to the XPS website utilizing one or more authentication mechanisms (e.g., user name and password) managed by the authentication module 160. Once secure access to the host server 140 is gained, the customer accesses the identification document management service in step 320. In step 330, the customer utilizes the UI to select the format or formats (e.g., hard copy, email, UI) in which the reproduction and/or instructions is to be generated. In step 340, the customer utilizes the UI (e.g., selects a link) to generate the reproduction and/or instructions in the format(s) selected in step 330. In step 350, the content management software application generates the reproduction and/or instructions based on the customer selection in step 340.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of providing an online identification document management service comprising:
    receiving from a user, via a web-based interface, an identification document comprising one or more graphical images of an official document;
    determining an official document category of the identification document, wherein determining the official document category comprises:
        prompting the user, via the web-based interface, for the official document category of the identification document; and
        receiving an indication from the user, via the web-based interface, of the official document category;
    storing the identification document in memory in association with the official document category;
    storing an association in memory between the official document category and characteristics of the identification document;
    receiving, via the web-based interface, a request to provide a copy of the identification document; and
    providing a copy of the identification document in response to the request.

2. The method of claim 1, further comprising:
    extracting textual data from the identification document.

3. The method of claim 2, further comprising:
    extracting the textual data using optical character recognition of the graphical images.

4. The method of claim 1, further comprising:
    categorizing a subsequently received different identification document under the official document category using the stored association.

5. The method of claim 2, further comprising:
    categorizing the identification document under a plurality a metadata categories based on the extracted textual data; and
    providing functionality, via the web-based interface, for the user to search for the identification document using one or more of the plurality of metadata categories.

6. The method of claim 1, wherein:
    receiving the request to provide a copy of the identification document comprises receiving a request to provide a copy of the identification document to a second user; and
    providing a copy of the identification document comprises providing a copy of the identification document to the second user.

7. The method of claim 1, wherein providing a copy of the identification document comprises one of:
    providing a copy of the identification document via email;
    providing a copy of the identification document as a graphical representation via the web-based interface; and
    providing a printed hard-copy of the identification document.

8. A system for providing an online identification document management service comprising:
    a processing system comprising one or more processors; and a memory system comprising one or more computer-readable media, wherein the computer-readable media contain instructions that, when executed by the processing system, cause the processing system to perform operations comprising:

receiving from a user, via a web-based interface, an identification document comprising one or more graphical images of an official document;

determining an official document category of the identification document, wherein determining the official document category comprises:

prompting the user, via the web-based interface, for the official document category of the identification document; and receiving an indication from the user, via the web-based interface, of the official document category;

storing the identification document in memory in association with the official document category;

storing an association in memory between the official document category and characteristics of the identification document;

receiving, via the web-based interface, a request to provide a copy of the identification document; and providing a copy of the identification document in response to the request.

9. The system of claim 8, the operations further comprising:

extracting textual data from the identification document.

10. The system of claim 9, the operations further comprising:

extracting the textual data using optical character recognition of the graphical images.

11. The system of claim 8, the operations further comprising:

categorizing a subsequently received different identification document under the official document category using the stored association.

12. The system of claim 9, the operations further comprising:

categorizing the identification document under a plurality a metadata categories based on the extracted textual data; and providing functionality, via the web-based interface, for the user to search for the identification document using one or more of the plurality of metadata categories.

13. The system of claim 8, wherein:

receiving the request to provide a copy of the identification document comprises receiving a request to provide a copy of the identification document to a second user; and providing a copy of the identification document comprises providing a copy of the identification document to the second user.

14. The system of claim 8, wherein providing a copy of the identification document comprises one of:

providing a copy of the identification document via email;

providing a copy of the identification document as a graphical representation via the web-based interface; and providing a printed hard-copy of the identification document.

\* \* \* \* \*